US012797893B2

(12) United States Patent
Choi et al.

(10) Patent No.: US 12,797,893 B2
(45) Date of Patent: Nov. 17, 2026

(54) ELECTRODE SLURRY CONTROL DEVICE

(71) Applicant: LG Energy Solution, Ltd., Seoul (KR)

(72) Inventors: Paul Choi, Daejeon (KR); Dong Hun Song, Deajeon (KR); Jung Sik Choi, Daejeon (KR); Dongwook Shin, Daejeon (KR); Shin Wook Jeon, Daejeon (KR); Sang Hoon Choy, Daejeon (KR); Hyunwoo Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 520 days.

(21) Appl. No.: 18/273,436

(22) PCT Filed: Nov. 1, 2022

(86) PCT No.: PCT/KR2022/016939
§ 371 (c)(1),
(2) Date: Jul. 20, 2023

(87) PCT Pub. No.: WO2023/085676
PCT Pub. Date: May 19, 2023

(65) Prior Publication Data

US 2024/0307912 A1 Sep. 19, 2024

(30) Foreign Application Priority Data

Nov. 12, 2021 (KR) ........................ 10-2021-0155725

(51) Int. Cl.
*B05C 11/10* (2006.01)
*H01M 4/04* (2006.01)

(52) U.S. Cl.
CPC ...... *B05C 11/1026* (2013.01); *B05C 11/1028* (2013.01); *H01M 4/0404* (2013.01)

(58) Field of Classification Search
CPC ............ B05C 11/1026; B05C 11/1028; H01M 4/0404
(Continued)

(56) References Cited

U.S. PATENT DOCUMENTS 2,672,844 A * 3/1954 Flint .................. B05B 13/0207 118/602
2,706,520 A * 4/1955 Chandler ................ F02C 7/228 137/98
(Continued)

FOREIGN PATENT DOCUMENTS

CN 107851773 A 3/2018
CN 210965714 U 7/2020
(Continued)

OTHER PUBLICATIONS

Search Report from International Application No. PCT/KR2022/016939, mailed Feb. 21, 2023.
(Continued)

*Primary Examiner* — Chee-Chong Lee
(74) *Attorney, Agent, or Firm* — Lerner David LLP

(57) ABSTRACT

An electrode slurry control device may include a main body configured to receive electrode slurry from an outside storage, a coater configured to discharge electrode slurry, a supply tube configured to supply the electrode slurry to the coater and connected to the main body through a first connection tube having a first opening/closing member, a first circulation tube connected to the main body through a second connection tube having a second opening/closing member; and a second circulation tube connected to the main body through a third connection tube having a third opening/closing member, a diameter of an inner peripheral surface of the second connection tube is smaller than an average diameter of an inner peripheral surface of the first circulation tube, and a diameter of an inner peripheral
(Continued)

surface of the third connection tube is larger than an average diameter of an inner peripheral surface of the second connection tube.

6 Claims, 17 Drawing Sheets

(58) Field of Classification Search
USPC .......................................................... 239/569
See application file for complete search history.

(56) References Cited

U.S. PATENT DOCUMENTS

| | | | | | |
|---|---|---|---|---|---|
| 3,061,198 | A * | 10/1962 | Kerr | G05D 7/03 239/102.1 |
| 3,081,947 | A * | 3/1963 | Taylor | B05B 13/0636 239/128 |
| 3,219,276 | A * | 11/1965 | Norris | B05B 13/0478 239/420 |
| 4,513,894 | A * | 4/1985 | Doyle | B24B 57/00 239/70 |
| 5,556,033 | A * | 9/1996 | Nachtman | B05B 12/1418 239/10 |
| 9,440,252 | B2 * | 9/2016 | Smith | B05C 17/015 |
| 2018/0198113 | A1 | 7/2018 | Ono et al. | |
| 2021/0016315 | A1 | 1/2021 | Yoshida et al. | |

FOREIGN PATENT DOCUMENTS

| | | | |
|---|---|---|---|
| JP | 2001354324 | A | 12/2001 |
| JP | 2003340338 | A | 12/2003 |
| JP | 4092462 | B2 | 5/2008 |
| JP | 2011194329 | A | 10/2011 |
| JP | 2014149083 | A | 8/2014 |
| JP | 5606828 | B2 | 10/2014 |
| JP | 5780085 | B2 | 9/2015 |
| JP | 2019093313 | A | 6/2019 |
| JP | 2020131145 | A | 8/2020 |
| JP | 2020138105 | A | 9/2020 |
| JP | 2021122760 | A | 8/2021 |
| KR | 101444541 | B1 | 9/2014 |
| KR | 101757239 | B1 | 7/2017 |
| KR | 20170101025 | A | 9/2017 |
| KR | 20180030529 | A | 3/2018 |

OTHER PUBLICATIONS

Extended European Search Report including Written Opinion for Application No. 22893098.8 dated Jul. 18, 2024, pp. 1-8.

* cited by examiner

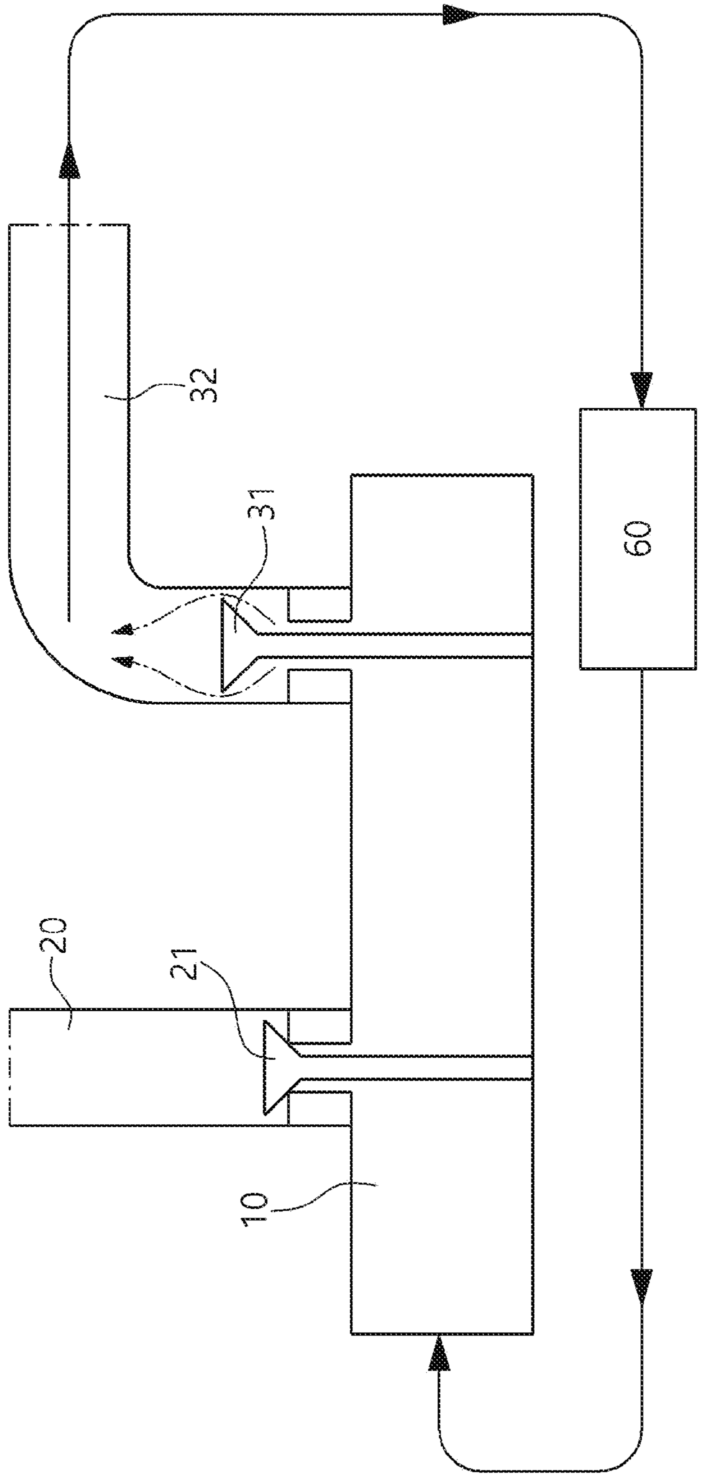
[FIG. 1]

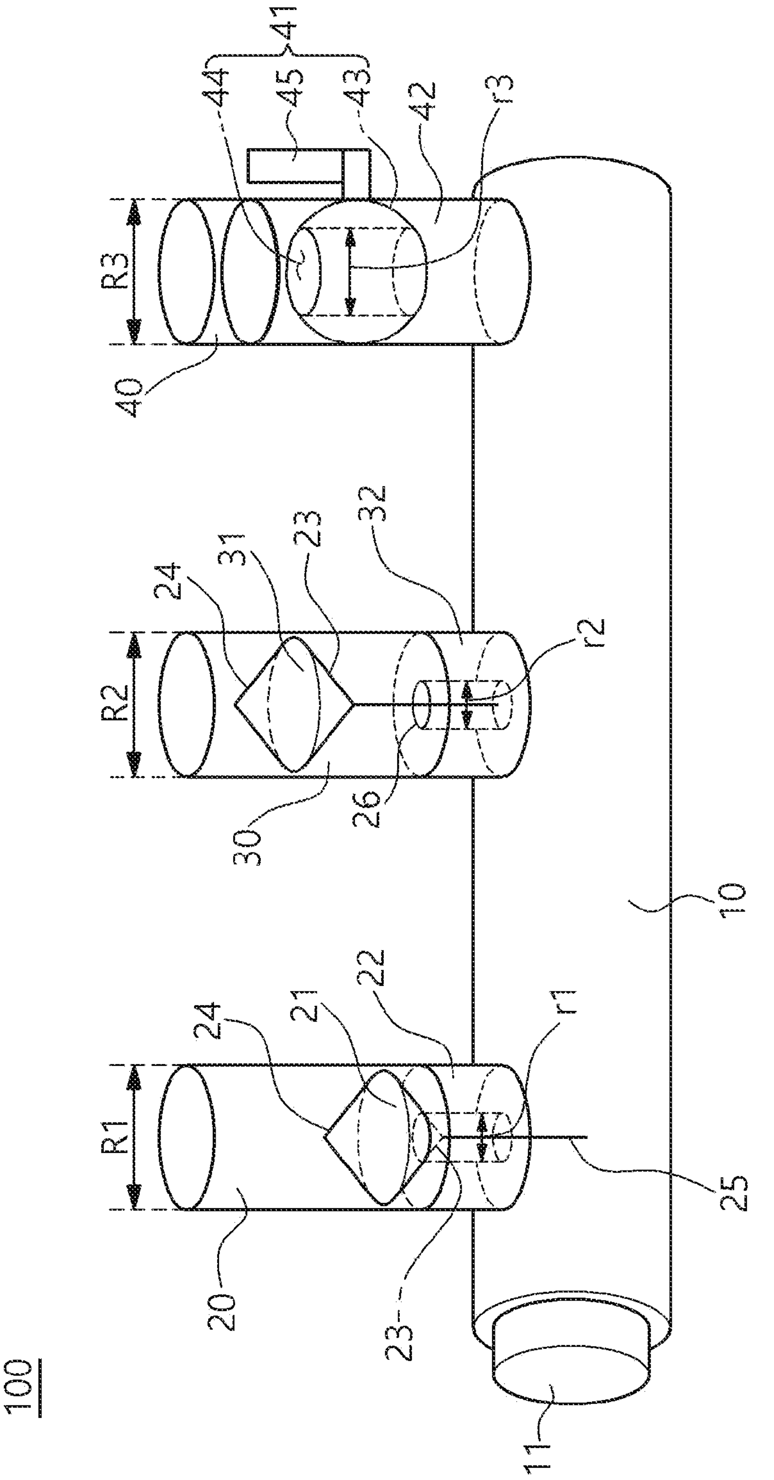
[FIG. 2]

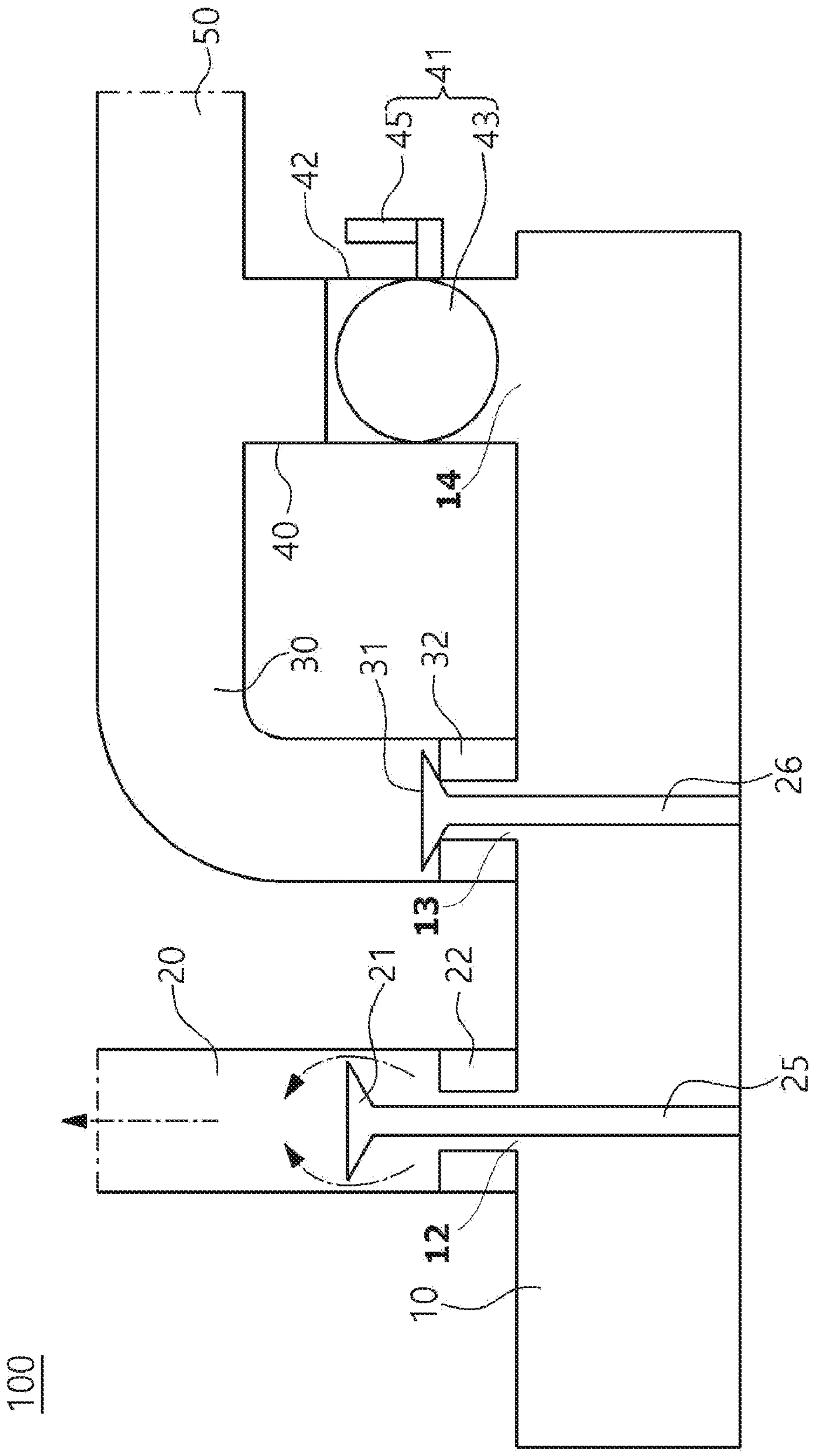
[FIG. 3]

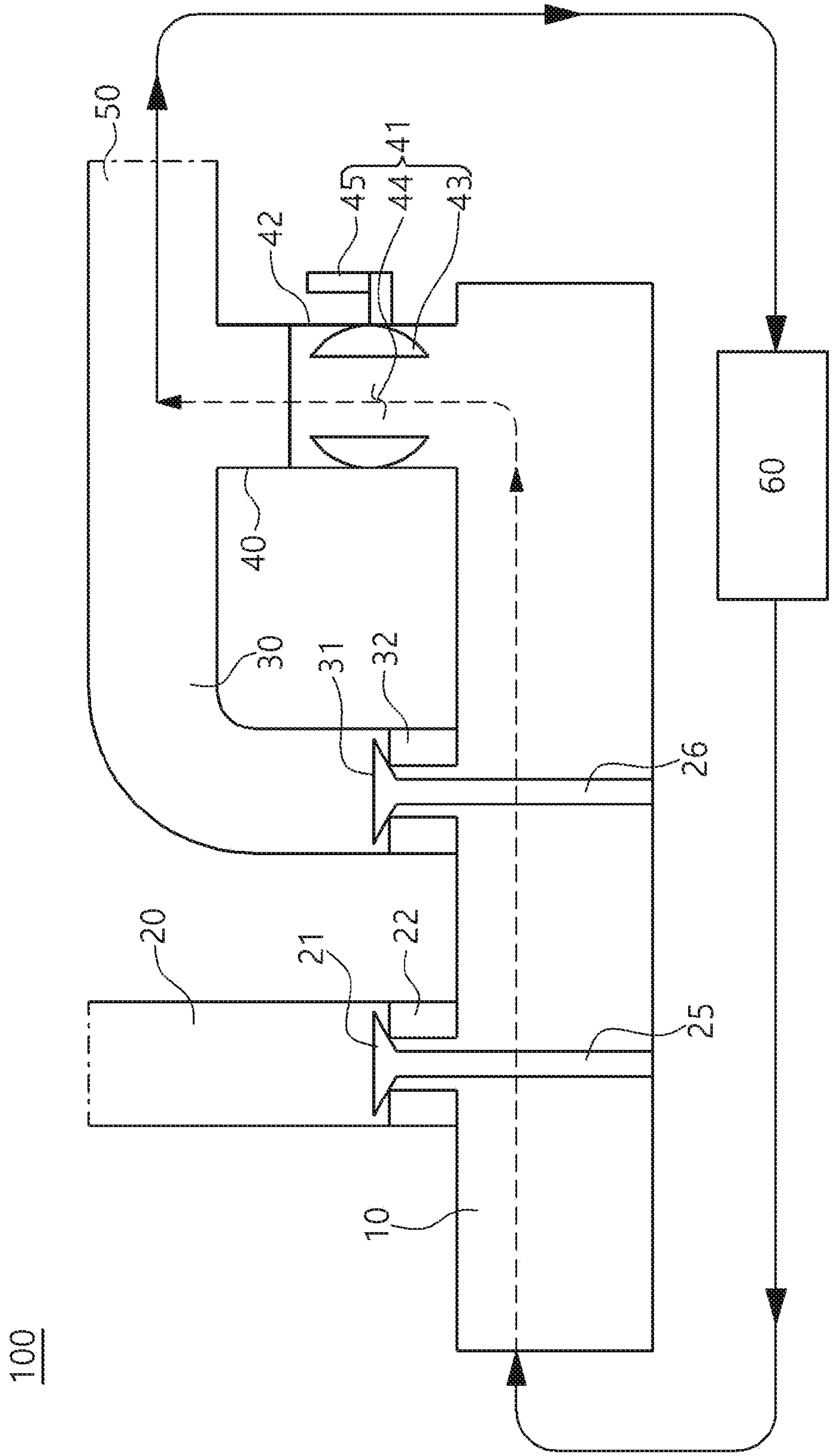
[FIG. 4]

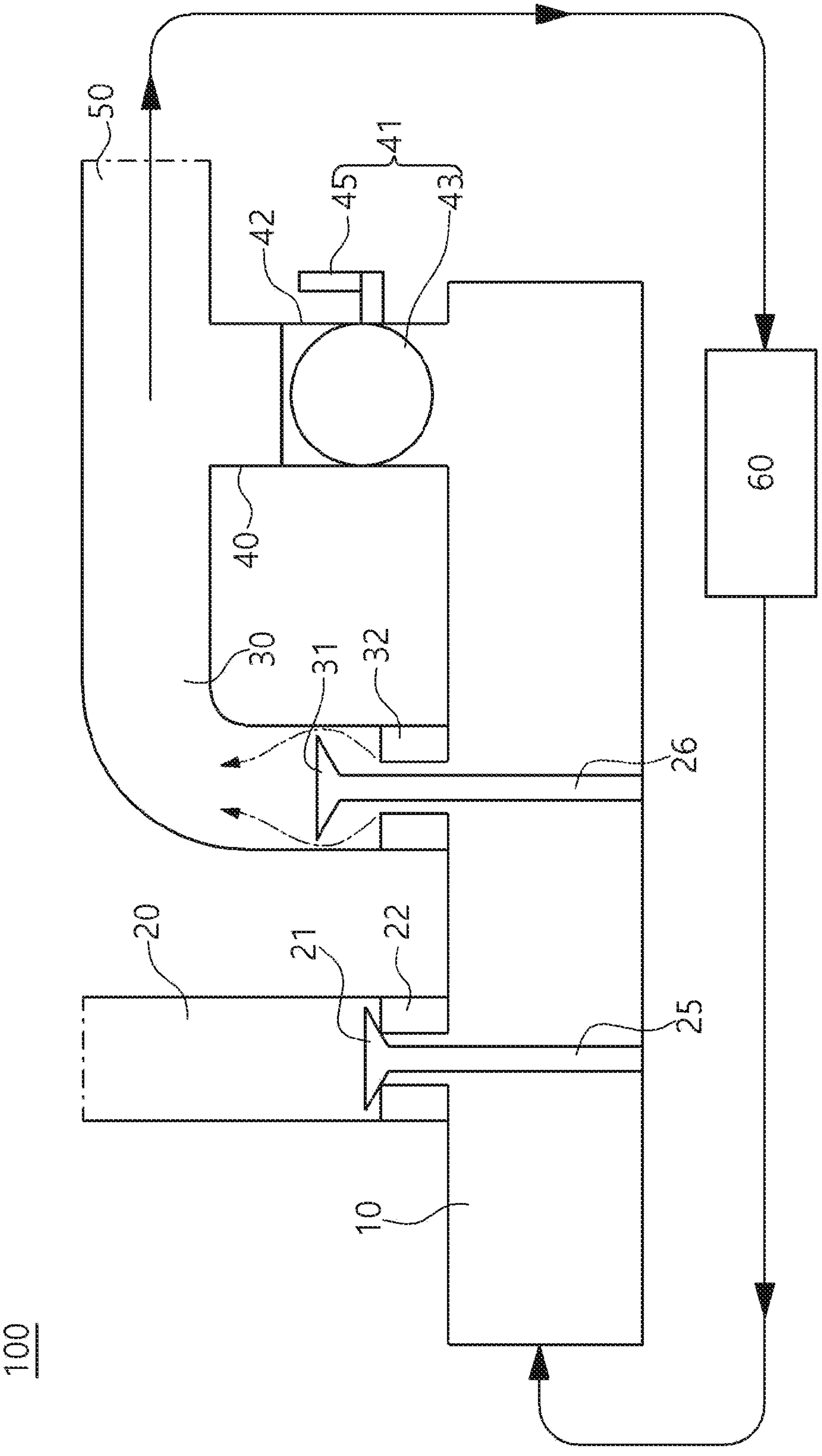
[FIG. 5]

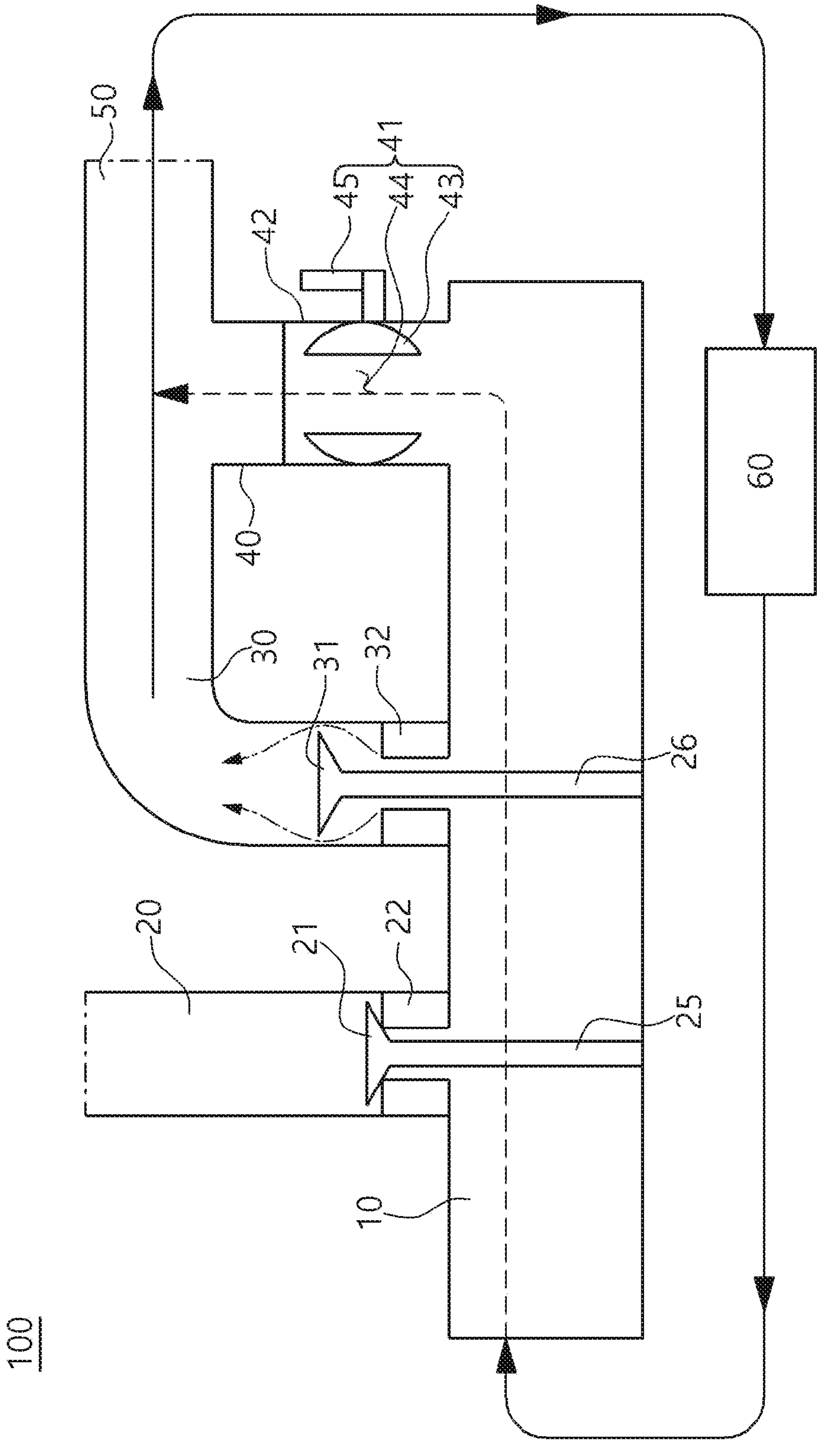
[FIG. 6]

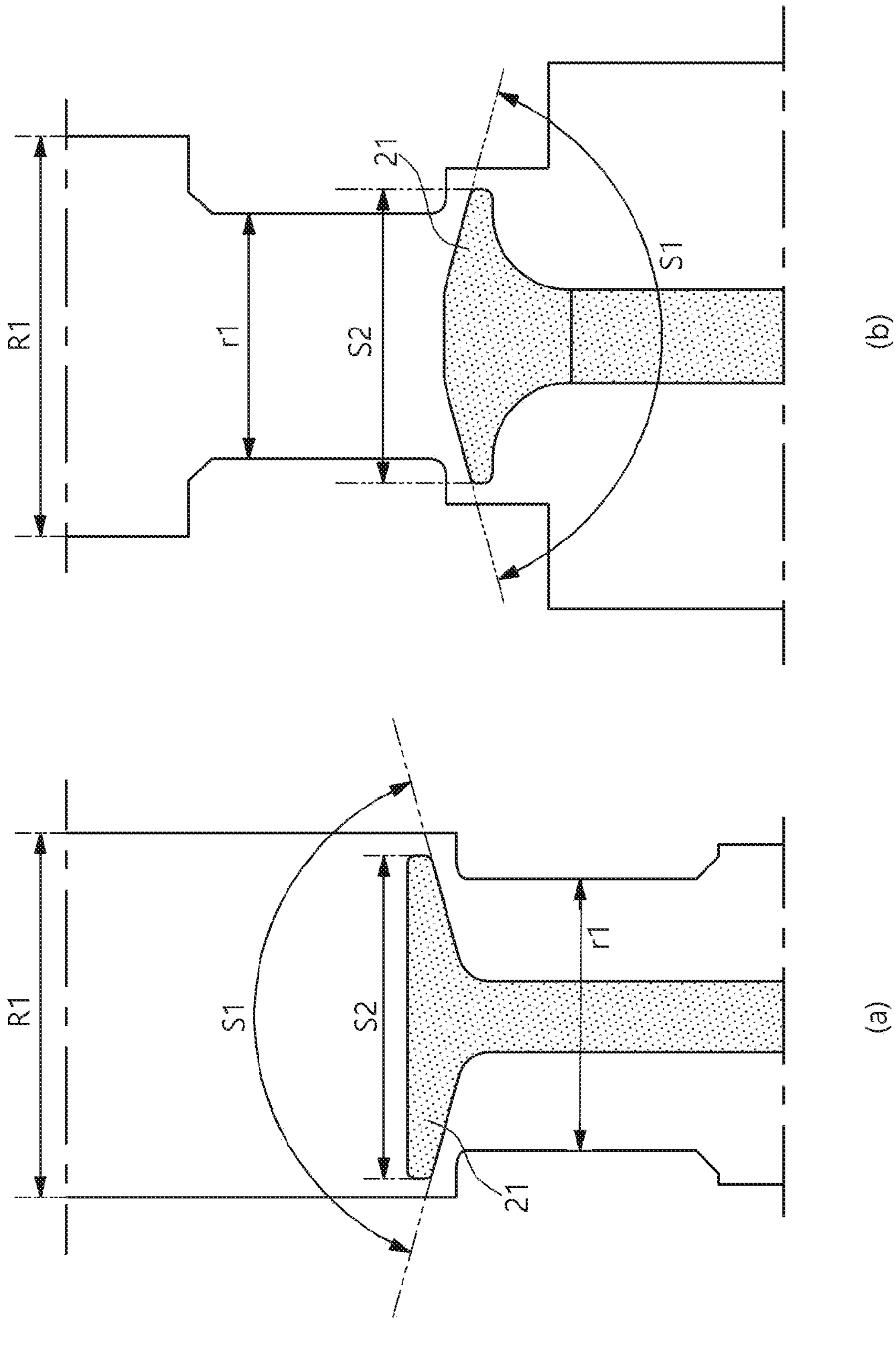
[FIG. 7]

[FIG. 8]
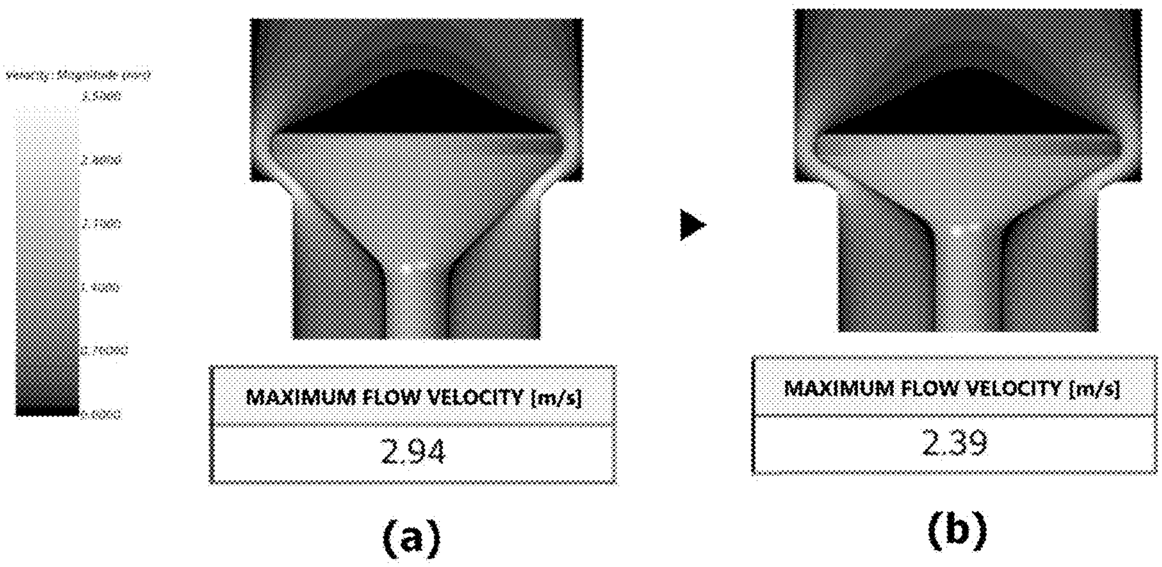
[FIG. 9]
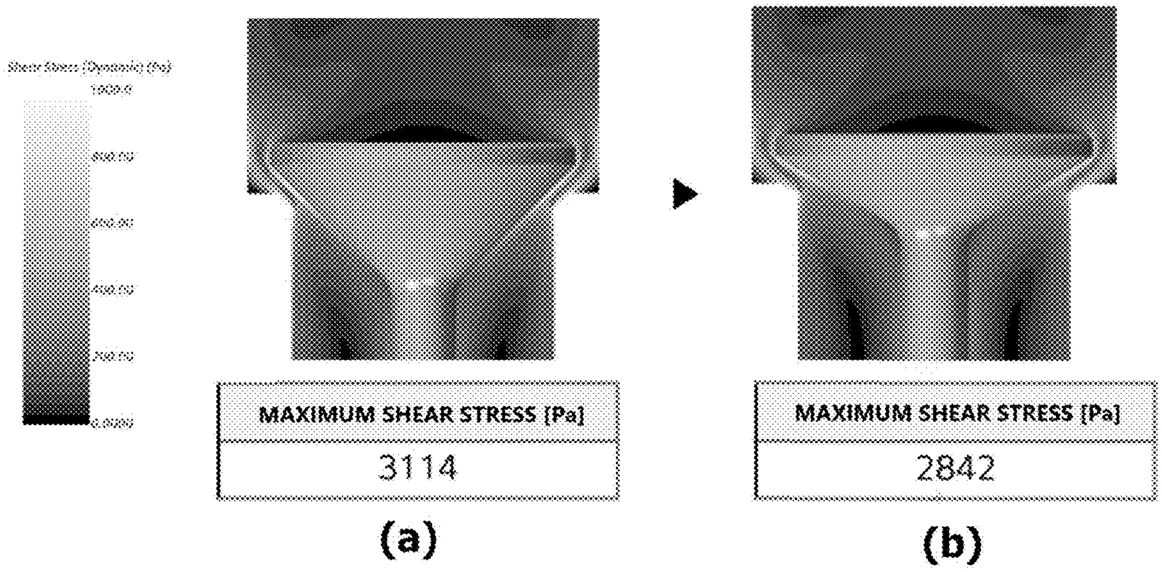

[FIG. 10]
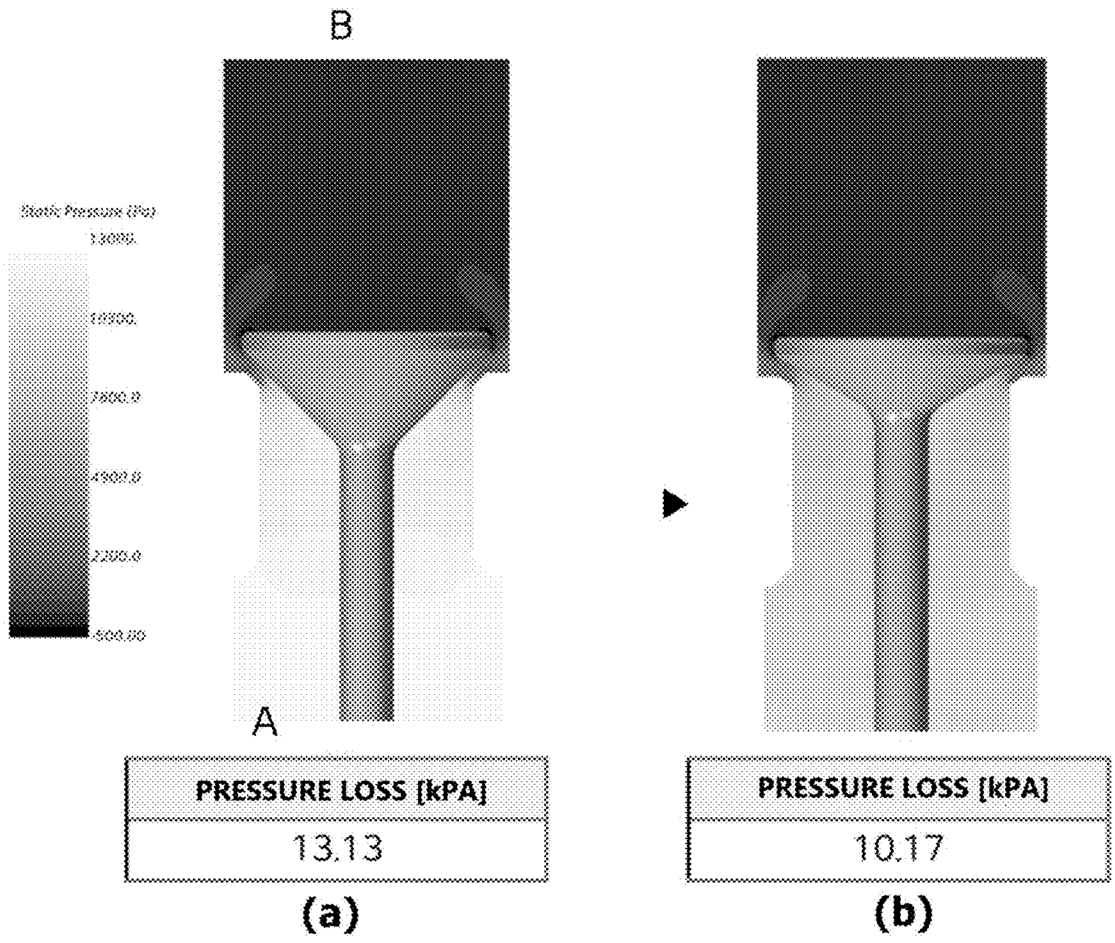
* PRESSURE LOSS IS CALCULATED ON BASIS OF PRESSURE DIFFERENCE BETWEEN POINTS A AND B.
STORKE IS FIXED TO 2mm

[FIG. 11]
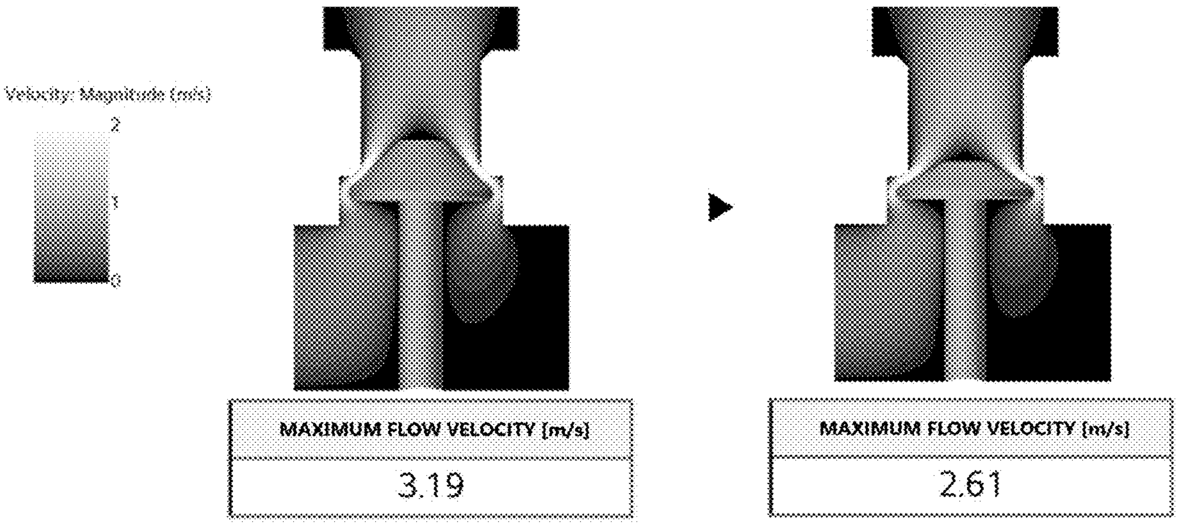
(a) (b)

[FIG. 12]
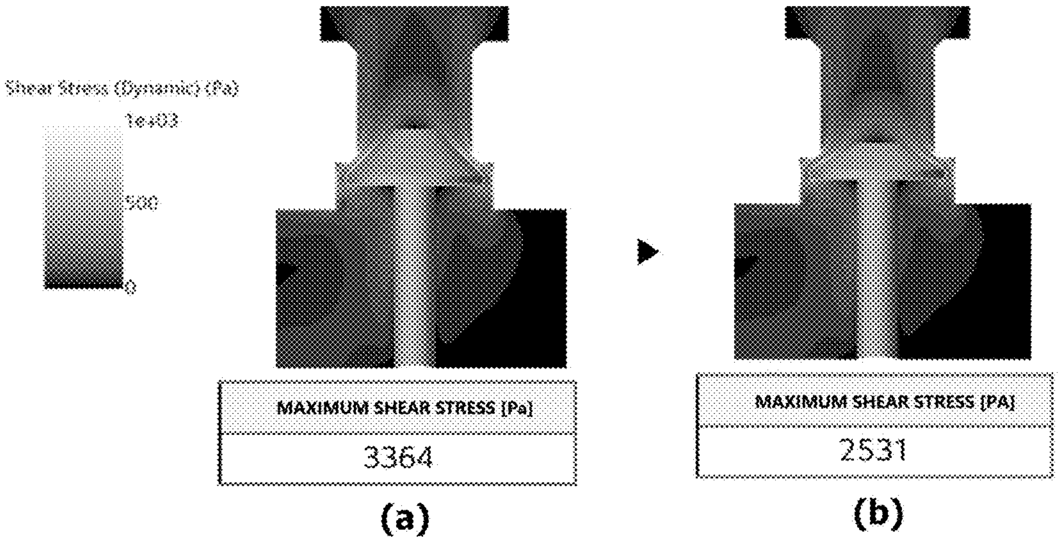
[FIG. 13]
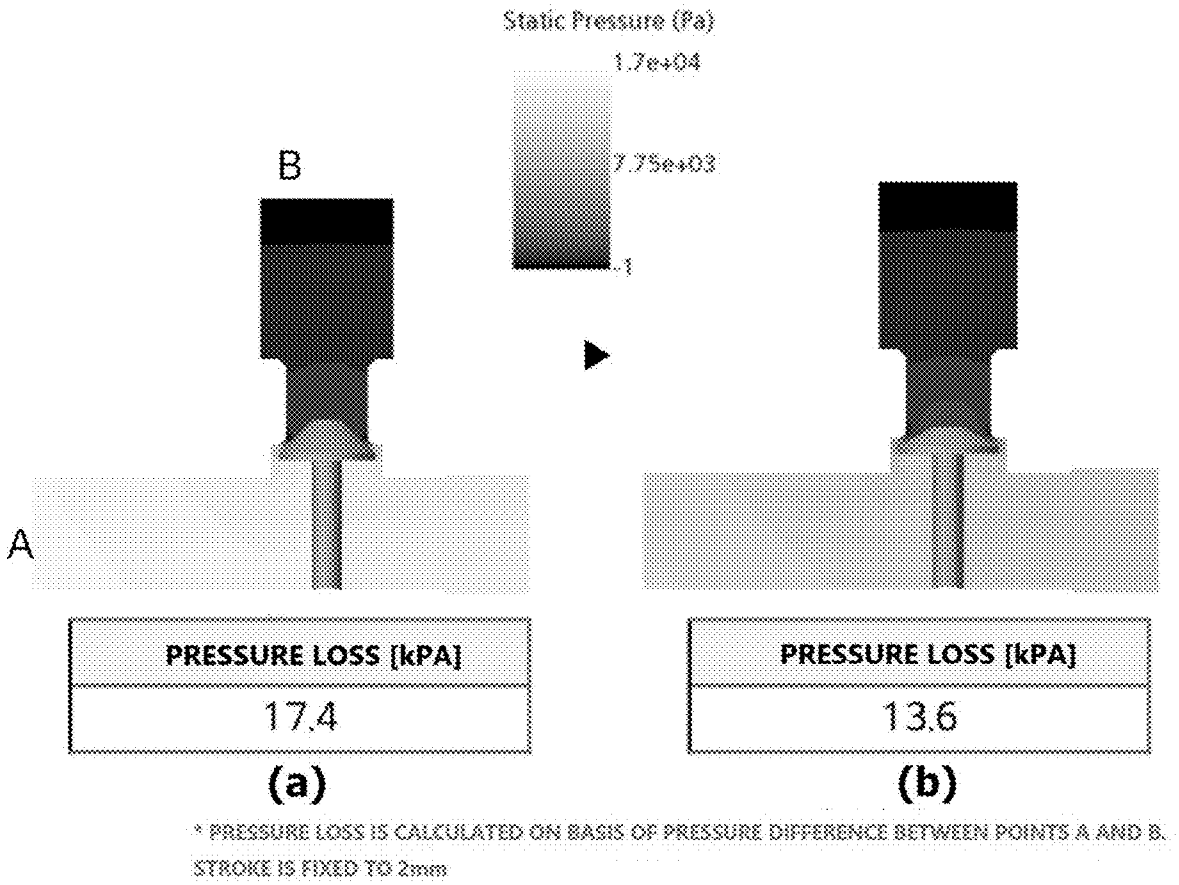

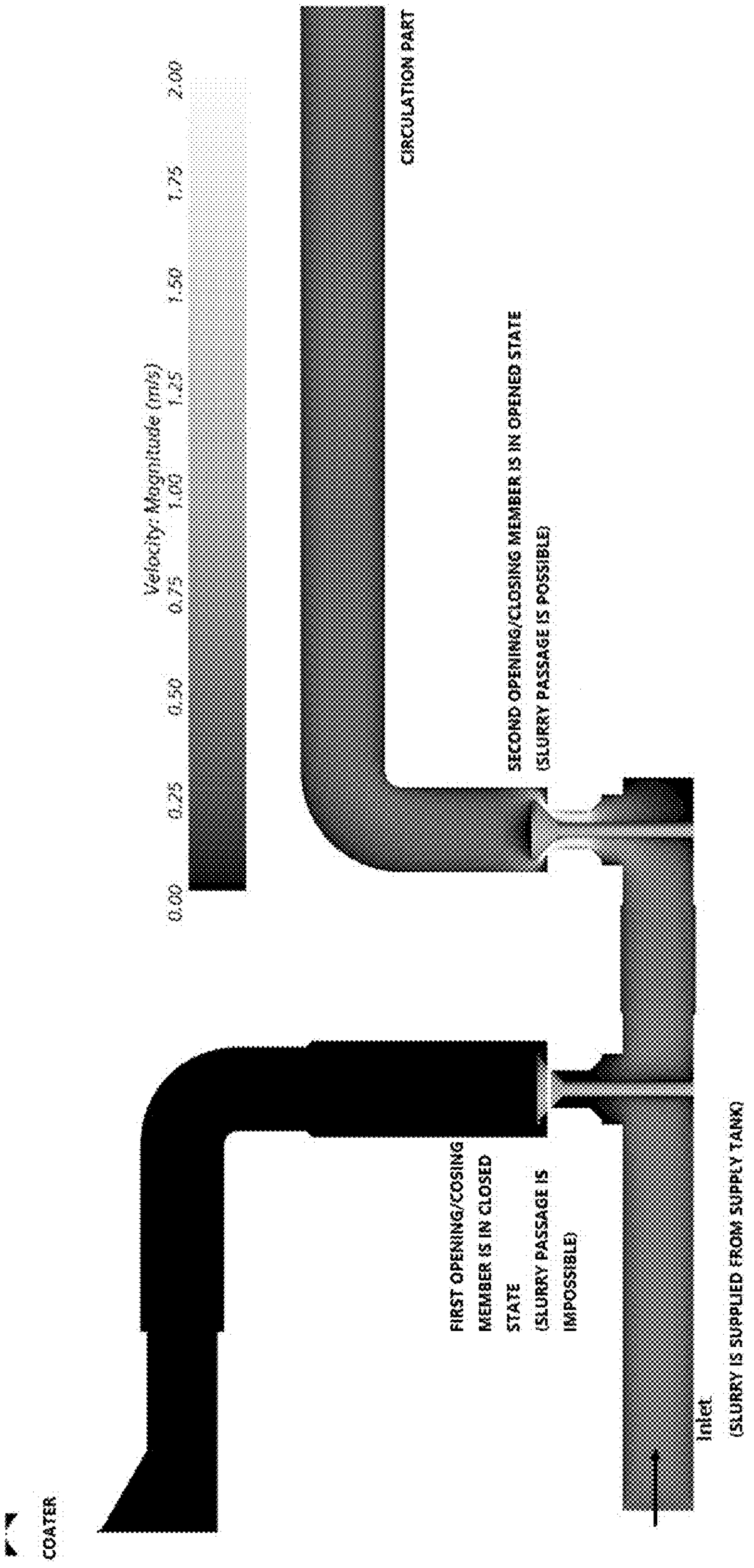
[FIG. 14]

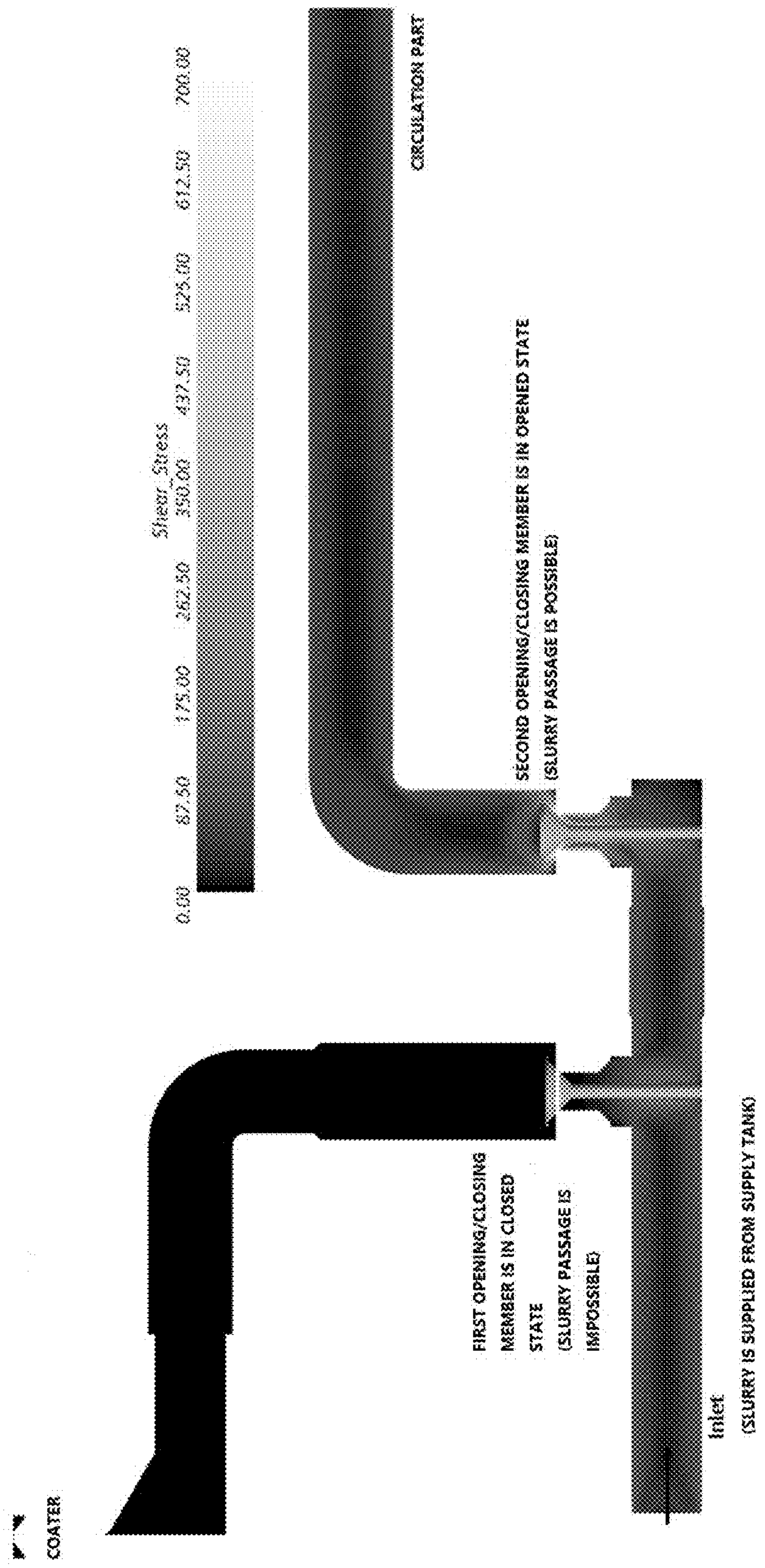
[FIG. 15]

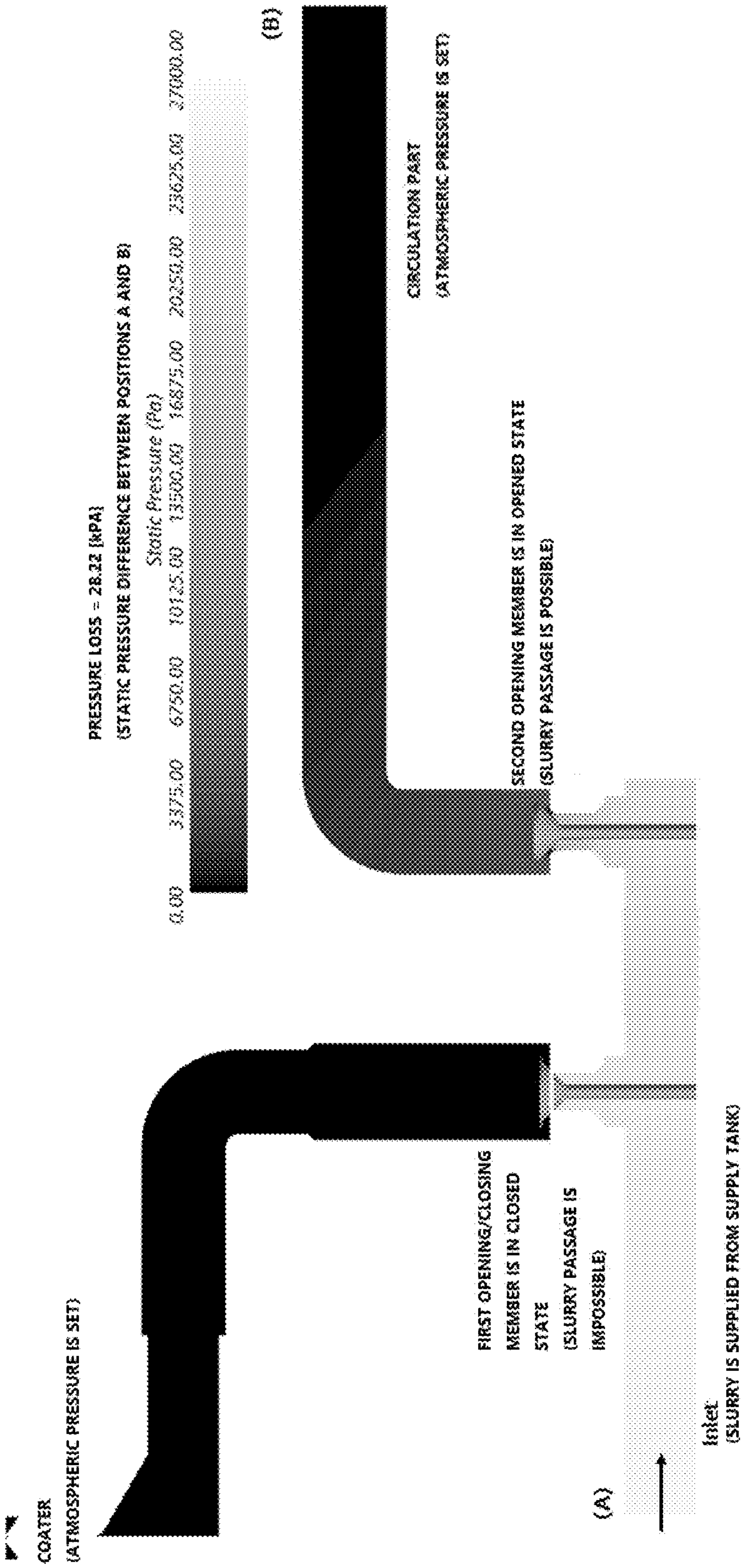
[FIG. 16]

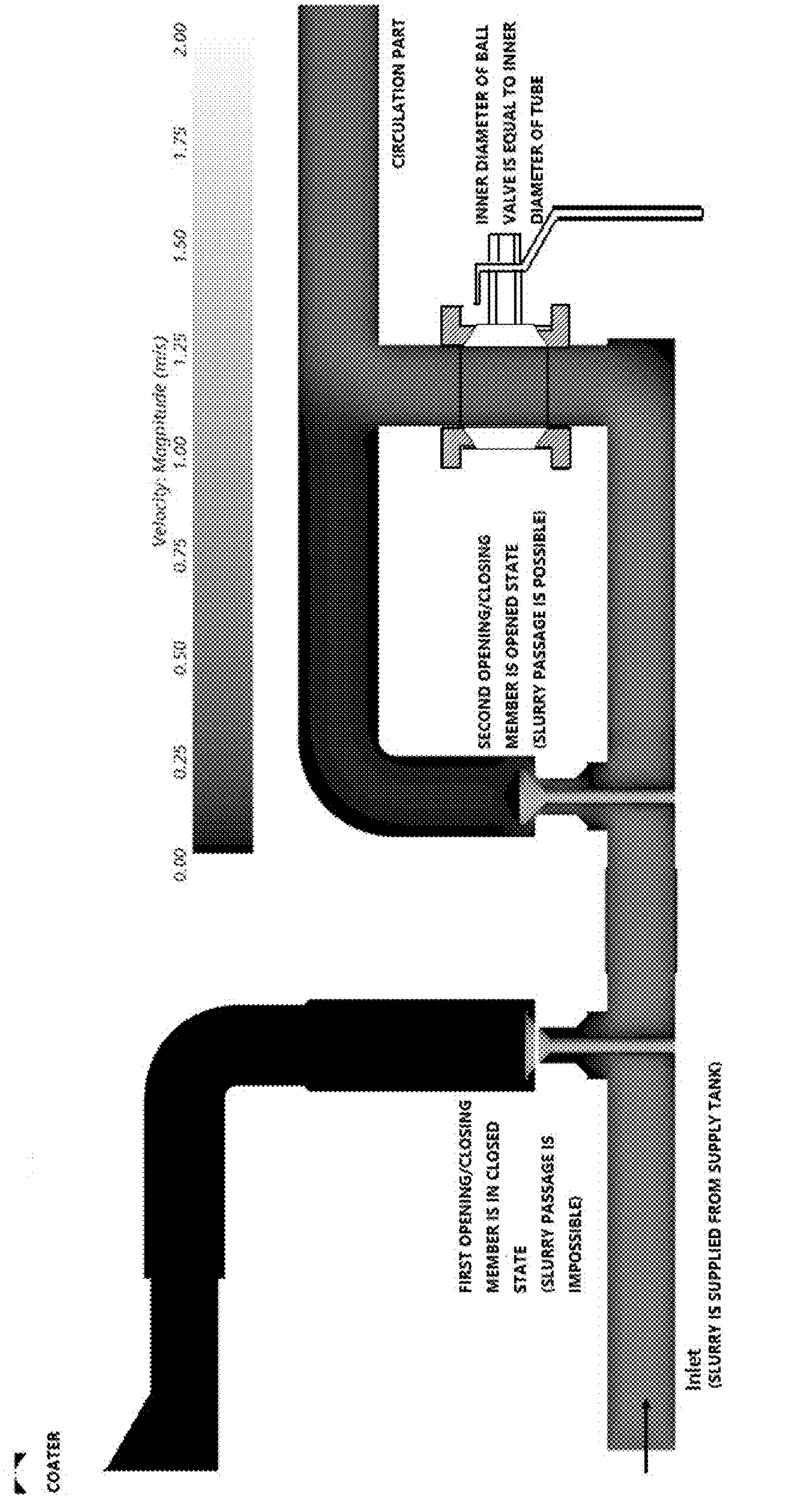
[FIG. 17]

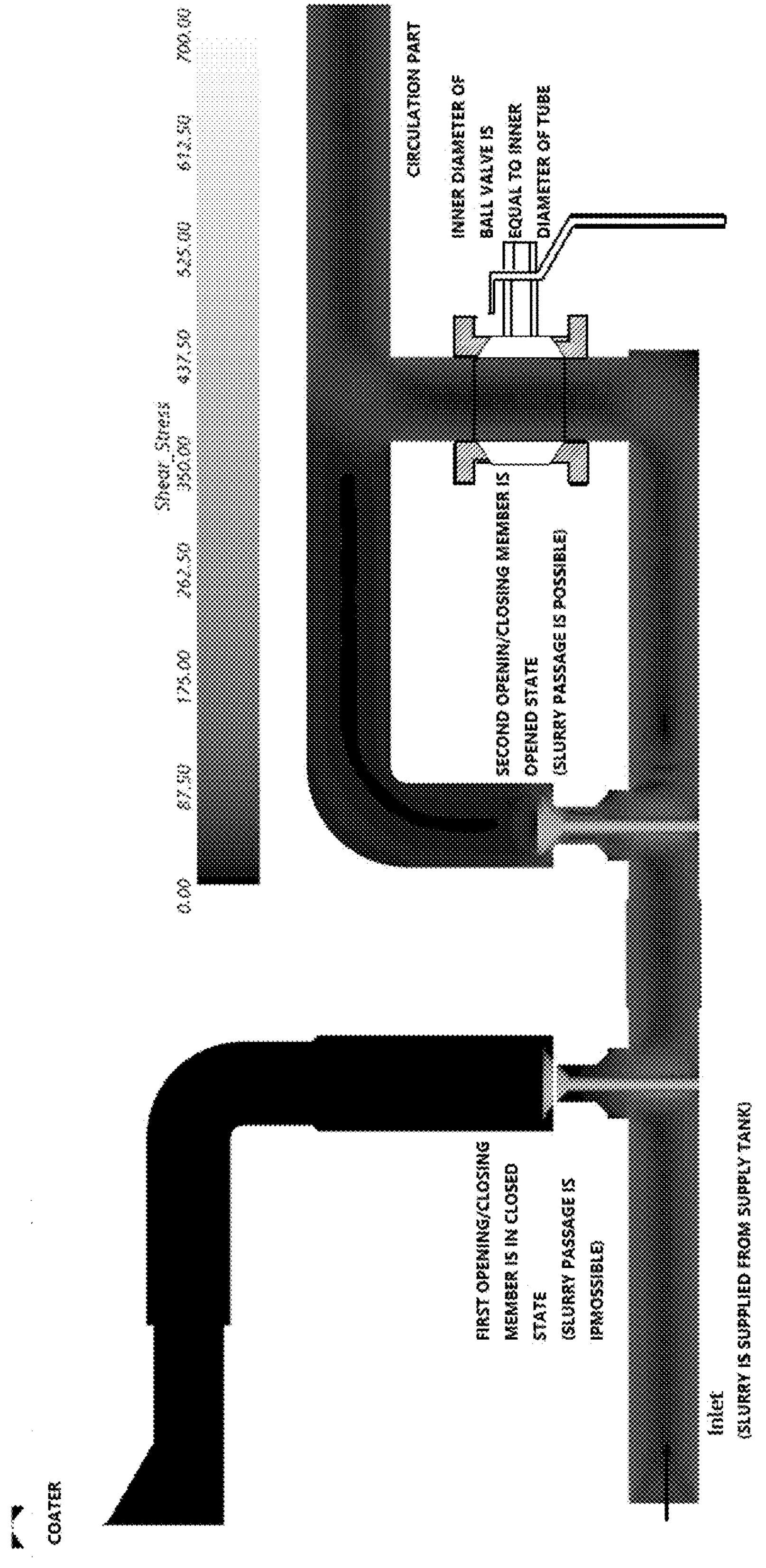
[FIG. 18]

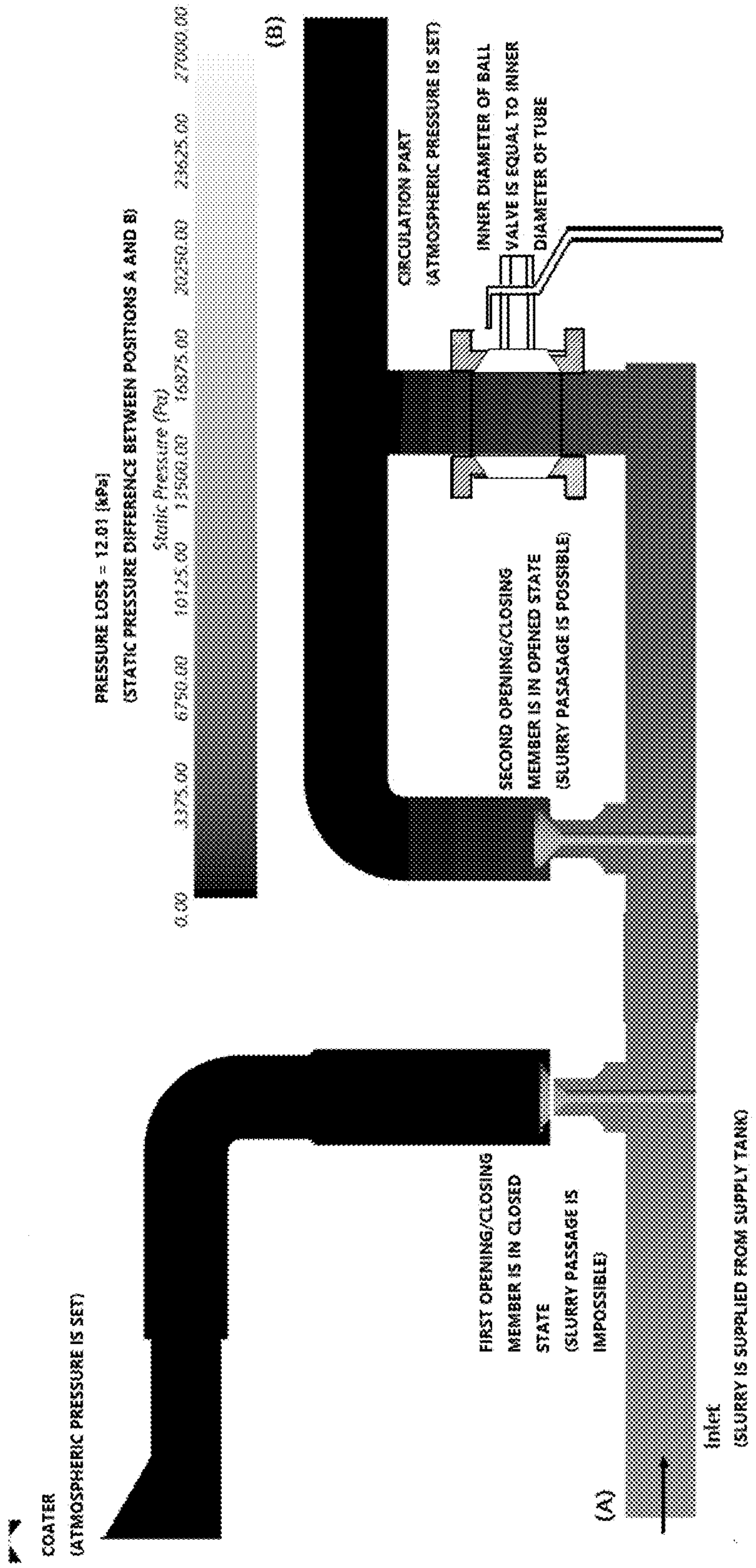
[FIG. 19]

ELECTRODE SLURRY CONTROL DEVICE

CROSS REFERENCE TO RELATED APPLICATIONS

This application is a national phase entry under 35 U.S.C. § 371 of International Application No. PCT/KR2022/016939 filed Nov. 1, 2022, which claims priority to and the benefit of Korean Patent Application No. 10-2021-0155725 filed with the Korean Intellectual Property Office on Nov. 12, 2021, the entire contents of which are incorporated herein by reference.

TECHNICAL FIELD

The present specification relates to an electrode slurry control device.

BACKGROUND ART

Recently, prices of energy sources have been raised because of the depletion of fossil fuels, and the interest in environmental pollution is increasing. Therefore, there is an increasing demand for environmental-friendly alternative energy sources. Therefore, research on various power production technologies such as nuclear power, solar power, wind power, and tidal power is being continuously conducted. In addition, interest in power storage devices for more efficiently using the produced energy is high.

In particular, as the development of technologies and demands for mobile devices are increased, there is a rapidly increasing demand for batteries as energy sources. Many studies are being conducted on the batteries in order to meet these needs.

Representatively, regarding a shape of the battery, there is a high demand for an angular or pouch-type secondary battery that may have a small thickness and be applied to products such as mobile phones. Regarding a material, there is a high demand for lithium secondary batteries such as lithium-ion batteries or lithium-ion polymer batteries that have advantages such as a high energy density, a discharge voltage, and output stability.

In general, the secondary battery is structured to include an electrode assembly made by stacking a positive electrode, a negative electrode, and a separator positioned between the positive electrode and the negative electrode. The positive and negative electrodes are each manufactured by applying slurry containing an active material onto a substrate.

The slurry is supplied from an ink storage to a coating device and applied onto the substrate. The slurry may be continuously supplied in case that continuous coating is performed. The slurry may be intermittently supplied in case that the substrate is replaced or a pattern having a coated portion and a non-coated portion needs to be formed on the substrate.

In this case, there is a need for a means capable of controlling processes of supplying the slurry and stopping the supply of slurry in order to temporarily and continuously supply the slurry or stop the supply of slurry as necessary. The processes of supplying the slurry and stopping the supply of slurry need to be precisely controlled in case that a more precise pattern is required.

DETAILED DESCRIPTION OF THE INVENTION

Technical Problem

The present specification is intended to provide an electrode slurry control device.

Technical Solution

An embodiment of the present specification provides an electrode slurry control device including: a main body having a receiving port configured to receive electrode slurry from an outside storage; a coater configured to discharge electrode slurry onto a substrate; a supply tube configured to supply the electrode slurry in the main body to the coater and connected to the main body through a first connection tube having a first opening/closing member; a first circulation tube configured to move a part of the electrode slurry introduced into the main body to the storage, the first circulation tube being connected to the main body through a second connection tube having a second opening/closing member; and a second circulation tube configured to move a part of the electrode slurry in the main body to the storage and connected to the main body through a third connection tube having a third opening/closing member, in which an average diameter of an inner peripheral surface of the second connection tube is smaller than an average diameter of an inner peripheral surface of the first circulation tube, and in which an average diameter of an inner peripheral surface of the third connection tube is larger than an average diameter of an inner peripheral surface of the second connection tube.

In another embodiment of the present specification, when the first opening/closing member closes the first connection tube, the second opening/closing member may open the second connection tube, the third opening/closing member may open the third connection tube, or the second opening/closing member and the third opening/closing member may respectively open the second connection tube and the third connection tube, and when the first opening/closing member opens the first connection tube, the second opening/closing member and the third opening/closing member may respectively close the second connection tube and the third connection tube.

In another embodiment of the present specification, an average diameter of an inner peripheral surface of the first connection tube may be smaller than an average diameter of an inner peripheral surface of the supply tube, the first opening/closing member may have a conical shape, a diameter of a conical lateral surface facing the first connection tube may gradually decrease toward the first connection tube, and a cone angle of the conical lateral surface may be 110 to 150 degrees.

In another embodiment of the present specification, the second opening/closing member may have a conical shape, a diameter of a conical lateral surface facing the second connection tube may gradually decrease toward the second connection tube, and a cone angle of the conical lateral surface may be 110 to 150 degrees.

In another embodiment of the present specification, the third opening/closing member may be a ball valve having a through-hole, and the average diameter of the inner peripheral surface of the third connection tube may be an average diameter of the through-hole.

In another embodiment of the present specification, the electrode slurry control device may further include a confluent tube connected to the first circulation tube and the second circulation tube so that the electrode slurry moving to the main body through the first circulation tube and the electrode slurry moving to the main body through the second circulation tube are merged.

Advantageous Effects

The electrode slurry control device according to the present specification may reduce shear stress of supplied electrode slurry.

The electrode slurry control device according to the present specification may uniformly control the amount of loading the supplied electrode slurry.

BRIEF DESCRIPTION OF DRAWINGS

FIG. 1 is a circulation diagram of an electrode slurry control device in the related art.

FIG. 2 is a perspective view of an electrode slurry control device according to an embodiment of the present specification.

FIG. 3 is a cross-sectional view illustrating a state in which the electrode slurry control device according to the embodiment of the present specification applies electrode slurry onto a substrate.

FIG. 4 is a circulation diagram illustrating a state in which the electrode slurry control device according to the embodiment of the present specification does not apply electrode slurry onto a substrate over a long period of time.

FIG. 5 is a circulation diagram illustrating a state in which the electrode slurry control device according to the embodiment of the present specification does not instantaneously apply electrode slurry onto a substrate during intermittent coating (pattern coating).

FIG. 6 is a circulation diagram illustrating a state in which an electrode slurry control device according to another embodiment of the present specification does not apply electrode slurry onto a substrate over a long period of time.

FIG. 7A is a view illustrating a case in which a cone valve, which is an opening/closing member of the electrode slurry control device according to the embodiment of the present specification, is provided in a regular position, and FIG. 7B is a view illustrating a case in which a cone valve is provided in a reverse position.

FIG. 8A is a view illustrating a change in flow velocity in a connection tube in which the cone valve having a cone angle of 90 degrees is provided in the regular position, and FIG. 8B is a view illustrating a change in flow velocity in a connection tube in which the cone valve having a cone angle of 120 degrees is provided in the regular position.

FIG. 9A is a view illustrating a change in shear stress in the connection tube in which the cone valve having the cone angle of 90 degrees is provided in the regular position, and FIG. 9B is a view illustrating a change in shear stress in the connection tube in which the cone valve having the cone angle of 120 degrees is provided in the regular position.

FIG. 10A is a view illustrating a change in pressure in the connection tube in which the cone valve having the cone angle of 90 degrees is provided in the regular position, and FIG. 10B is a view illustrating a change in pressure in the connection tube in which the cone valve having the cone angle of 120 degrees is provided in the regular position.

FIG. 11A is a view illustrating a change in flow velocity in the connection tube in which the cone valve having the cone angle of 90 degrees is provided in the reverse position, and FIG. 11B is a view illustrating a change in flow velocity in the connection tube in which the cone valve having the cone angle of 120 degrees is provided in the reverse position.

FIG. 12A is a view illustrating a change in shear stress in the connection tube in which the cone valve having the cone angle of 90 degrees is provided in the reverse position, and FIG. 12B is a view illustrating a change in shear stress in the connection tube in which the cone valve having the cone angle of 120 degrees is provided in the reverse position.

FIG. 13A is a view illustrating a change in pressure in the connection tube in which the cone valve having the cone angle of 90 degrees is provided in the reverse position, and FIG. 13B is a view illustrating a change in pressure in the connection tube in which the cone valve having the cone angle of 120 degrees is provided in the reverse position.

FIG. 14 is a view illustrating a change in flow velocity of slurry in an arrangement state for a coating interruption period in which a first opening/closing member is closed and a second opening/closing member is opened in the electrode slurry control device in the related art in FIG. 1.

FIG. 15 is a view illustrating a change in shear stress applied to slurry in the arrangement state for the coating interruption period in which the first opening/closing member is closed and the second opening/closing member is opened in the electrode slurry control device in the related art in FIG. 1.

FIG. 16 is a view illustrating a change in static pressure of slurry in the arrangement state for the coating interruption period in which the first opening/closing member is closed and the second opening/closing member is opened in the electrode slurry control device in the related art in FIG. 1.

FIG. 17 is a view illustrating a change in flow velocity of slurry in an arrangement state for a long-term coating interruption period in which a first opening/closing member is closed and second and third opening/closing members are opened in a novel slurry control device in FIG. 6.

FIG. 18 is a view illustrating a change in shear stress in slurry in the arrangement state for the long-term coating interruption period in which the first opening/closing member is closed and the second and third opening/closing members are opened in the novel slurry control device in FIG. 6.

FIG. 19 is a view illustrating a change in static pressure of slurry in the arrangement state for the long-term coating interruption period in which the first opening/closing member is closed and the second and third opening/closing members are opened in the novel slurry control device in FIG. 6.

EXPLANATION OF REFERENCE NUMERALS AND SYMBOLS

100: Electrode slurry control device
10: Main body
11: Receiving port
12: First opening
13: Second opening
14: Third opening
20: Supply tube
21: First opening/closing member
22: First connection tube
23: Conical lateral surface
24: Second conical lateral surface
25: First connection member
26: Second connection member
30: First circulation tube
31: Second opening/closing member

32: Second connection tube
40: Second circulation tube
41: Third opening/closing member
42: Third connection tube
43: Ball
44: Through-hole
45: Valve
50: Confluent tube
60: Storage

BEST MODE

Hereinafter, the present invention will be described in detail with reference to the drawings. However, the drawings are intended to illustratively describe the present invention, and the scope of the present invention is not limited by the drawings.

FIG. 2 is a perspective view of an electrode slurry control device 100 according to an embodiment of the present specification, and FIG. 3 is a cross-sectional view of the electrode slurry control device 100 according to the embodiment of the present specification.

The electrode slurry control device 100 includes a main body 10, a supply tube 20, a first circulation tube 30, and a second circulation tube 40.

The main body 10 has a receiving port 11 formed at an end thereof, and the receiving port 11 is provided to receive electrode slurry from a storage (not illustrated) that stores the electrode slurry. In addition, a first connection tube 22 connected to a first opening 12 of the main body 10 is opened or closed by a first opening/closing member 21. When the first connection tube 22 is opened, the electrode slurry in the main body 10 is supplied to a coater through the supply tube 20, and the coater discharges the electrode slurry onto a substrate. A second connection tube 32 connected to a second opening 13 of the main body 10 is opened or closed by a second opening/closing member 31. When the second connection tube 32 is opened, the electrode slurry in the main body 10 is moved to the storage through the first circulation tube 30. A third connection tube 42 connected to a third opening 14 of the main body 10 is opened or closed by a third opening/closing member 41. When the third connection tube 42 is opened, the electrode slurry in the main body 10 is moved to the storage through the second circulation tube 40.

The supply tube 20 is coupled to the coater (not illustrated) configured to coat the substrate. The first circulation tube 30 is connected to the second opening 13 of the main body 10 and the storage and configured to circulate the electrode slurry to the outside storage.

In this case, the main body 10, the supply tube 20, and the first circulation tube 30 may be provided in the form of a cylindrical tube, and an average diameter and shape of each of the main body 10, the supply tube 20, and the first circulation tube 30 may be freely changed because the average diameter and shape may be freely designed by a designer, as necessary.

In this case, the substrate is not particularly limited as long as the substrate may be coated with electrode slurry. The substrate may be a current collector, specifically, a metal foil. The substrate may be a foil made of copper, aluminum, or a combination thereof.

The electrode slurry, which is to be applied by the coater, may include an electrode active material, a binder, and a solvent.

The electrode active material is not particularly limited as long as the electrode active material is a material used for a positive electrode or a negative electrode of a battery. In the case of the positive electrode, the electrode active material may be LCO ($LiCoO_2$), NCM ($Li(NiCoMn)O_2$), NCA ($Li(NiCoAl)O_2$), LMO ($LiMn_2O$), LFP ($LifePO_4$), or the like. The electrode active material may be carbon (graphite) or the like in the case of the negative electrode.

The binder is not particularly limited as long as the binder may coagulate the electrode active material. The binder may be selected from binders used in the technical field.

The solvent is not particularly limited as long as the solvent may provide fluidity to the electrode slurry. The solvent may be water, N-methyl pyrrolidone, or the like.

The supply tube 20 is connected to the main body 10 through the first connection tube 22. Therefore, the first connection tube 22 is positioned between the supply tube 20 and the main body 10. An average diameter r1 of an inner peripheral surface of the first connection tube 22 is smaller than an average diameter R1 of an inner peripheral surface of the supply tube 20.

Meanwhile, an average diameter of an outer peripheral surface of the first connection tube 22 may be equal to an average diameter of an outer peripheral surface of the supply tube 20 to implement convenience and stability in coupling the first connection tube 22 and the supply tube 20.

In this case, the first connection tube 22 may be made of a metallic material having predetermined rigidity. Any material may be used as long as the material may withstand a pressure applied by the supply of the electrode slurry.

The first circulation tube 30 is connected to the main body 10 through the second connection tube 32. Therefore, the second connection tube 32 is positioned between the first circulation tube 30 and the main body 10. An average diameter r2 of an inner peripheral surface of the second connection tube 32 is smaller than an average diameter R2 of an inner peripheral surface of the first circulation tube 30.

Meanwhile, an average diameter of an outer peripheral surface of the first circulation tube 30 may be equal to an average diameter of an outer peripheral surface of the first circulation tube 30 to implement convenience and stability in coupling the second connection tube 32 and the first circulation tube 30.

In this case, the second connection tube 32 may be made of a metallic material having predetermined rigidity. Any material may be used as long as the material may withstand a pressure applied by the supply of the electrode slurry.

The second circulation tube 40 is connected to the main body 10 through the third connection tube 42. Therefore, the third connection tube 42 is positioned between the second circulation tube 40 and the main body 10.

The second circulation tube 40 has the third opening/closing member 41. An average diameter of an inner peripheral surface of the third connection tube 42 is an average diameter of a hole opened by the third opening/closing member 41. For example, the third opening/closing member 41 may be a ball valve having a through-hole. An average diameter r3 of an inner peripheral surface of the third connection tube 42 may be an average diameter r3 of the through-hole. The average diameter r3 of the inner peripheral surface of the third connection tube 42 is equal to or smaller than an average diameter R3 of an inner peripheral surface of the second circulation tube 40.

Meanwhile, an average diameter of an outer peripheral surface of the third connection tube 42 may be equal to an average diameter of an outer peripheral surface of the second circulation tube 40 to implement convenience and stability in coupling the third connection tube 42 and the second circulation tube 40. To implement convenience and stability in coupling the third connection tube 42 and the second circulation tube 40, an average diameter of an end of the third connection tube 42 coupled to the second circulation tube 40 may be equal to the average diameter of the outer peripheral surface of the second circulation tube 40, and an average diameter of an outer peripheral surface of a portion where the third opening/closing member 41 is provided may be larger than the average diameter of the outer peripheral surface of the second circulation tube 40.

In this case, the third connection tube 42 may be made of a metallic material having predetermined rigidity. Any material may be used as long as the material may withstand a pressure applied by the supply of the electrode slurry.

The first opening/closing member 21 is provided in the supply tube 20 and configured to open or close the first connection tube 22. The second opening/closing member 31 is provided in the first circulation tube 30 and configured to open or close the second connection tube 32.

The second opening/closing member 31 may be identical in shape to the first opening/closing member 21, and the second opening/closing member 31 may be different in size and average diameter from the first opening/closing member 21. However, because the second opening/closing member 31 may open or close the second connection tube 32 on the same principle as the first opening/closing member 21 that opens or closes the first connection tube 22, a repeated description thereof will be omitted.

The first opening/closing member 21 has a conical lateral surface 23 that faces the first connection tube 22. When a cone, which faces the first connection tube 22, and particularly, is defined by the conical lateral surface 23, is referred to as a first cone, a second conical lateral surface 24 may be formed and positioned to correspond to a side opposite to the first cone.

The first opening/closing member 21 may be a cone valve having a conical shape so that a diameter of the conical lateral surface 23 facing the first connection tube 22 gradually decreases outward.

In this case, the conical lateral surface 23 and the second conical lateral surface 24 each have a conical shape having a diameter that gradually decreases outward. In this case, the conical lateral surface means a curved surface defined by connecting a vertex and a circle of a bottom of a conical shape.

Therefore, the first opening/closing member 21 has a single conical shape or a shape defined by bonding bottoms of two identical cones. In case that the first opening/closing member 21 has a shape defined by bonding bottoms of two identical cones, a conical shape of the conical lateral surface 23 and a conical shape of the second conical lateral surface 24 define a symmetric structure.

In this case, the second conical lateral surface 24 of the first opening/closing member 21 may be formed sharply in a conical shape, or a vertex of the second conical lateral surface 24 may be rounded.

A cone angle of the first opening/closing member 21 may be 110 to 150 degrees. Specifically, the cone angle of the first opening/closing member 21 may be 110 to 140 degrees, 110 to 130 degrees, or 115 to 125 degrees. Particularly, the cone angle of the first opening/closing member 21 may be 120 degrees.

FIGS. 8 to 13 are views illustrating comparison of flow velocity, shear stress, and pressure of the electrode slurry between when a cone valve in the related art having a cone angle of 90 degrees is opened or closed and when a cone valve having a cone angle of 120 degrees is opened or closed.

It is possible to implement an effect of reducing frictional resistance against the electrode slurry when the first opening/closing member 21 and the second opening/closing member 31 repeatedly reciprocate.

In addition, the friction between the first opening/closing member 21 and the electrode slurry may be reduced, such that the pressure of the electrode slurry applied to the first opening/closing member 21 when the first opening/closing member 21 moves may be reduced, which makes it possible to prevent malfunction, minimize the amount of electrode slurry pushed upward to a location above the second conical lateral surface 24, and prevent the occurrence of a portion where a large amount of coating is locally performed during an initial coating process.

Meanwhile, the first opening/closing member 21 may be formed by bonding bottoms of two identical cones. Alternatively, the first opening/closing member 21 may be initially manufactured in a shape identical to the shape defined by bonding the bottoms of the two identical cones without bonding the bottoms of the two identical cones.

However, the first opening/closing member 21 may be formed in a shape defined by coupling two cones selectively having different average diameters in accordance with the type, viscosity, and other properties of the electrode slurry.

In addition, the material of the first opening/closing member 21 may have predetermined rigidity without having permeability so as to perfectly block the electrode slurry introduced into the supply tube 20 through the first connection tube 22. Specifically, the material of the first opening/closing member 21 may be, but not limited to, a metallic material.

Meanwhile, the first opening/closing member 21 further includes a first connection member 25 connected to a driving part (not illustrated). The second opening/closing member 31 further includes a second connection member 26 connected to the driving part (not illustrated).

The first and second connection members 25 and 26 may be provided in the form of a bar. When power is transmitted to the first and second connection members 25 and 26 by the driving part, the first and second opening/closing members 21 and 31 may move.

In this case, the first and second connection members 25 and 26 may each have rigidity to a degree to which the first and second connection members 25 and 26 may withstand the pressure applied in the main body 10 by the electrode slurry. Specifically, the first and second connection members 25 and 26 may each be made of a metallic material.

In addition, the first and second connection members 25 and 26 may each have a thickness much smaller than the average diameter of the inner peripheral surface of each of the first and second connection tubes 22 and 32. This is to prevent the first and second connection members 25 and 26 from occupying large volumes in the first and second connection tubes 22 and 32 and to minimize the extent to which the movements of the first and second connection members 25 and 26 affect the movement of the electrode slurry.

FIG. 3 is a view illustrating an operating state in which the supply tube 20 is opened and the first and second circulation tubes 30 and 40 are closed in the electrode slurry control device. FIG. 4 is a view illustrating an operating state in which the supply tube 20 and the first circulation tube 30 are closed and the second circulation tube 40 is opened in the electrode slurry control device. FIG. 5 is a view illustrating an operating state in which the supply tube 20 and the second circulation tube 40 are closed and the first circulation tube 30 is opened in the electrode slurry control device. FIG.

6 is a view illustrating an operating state in which the supply tube 20 is closed and the first and second circulation tubes 30 and 40 are opened in the electrode slurry control device.

As illustrated in FIGS. 2 and 3, the first connection member 25 connected to the driving part (not illustrated) allows the first opening/closing member 21 to open or close the first connection tube 22, and the second connection member 26 allows the second opening/closing member 31 to open or close the second connection tube 32.

The third opening/closing member 41 may be a ball valve having a through-hole 44. A ball 43 having the through-hole 44 may be provided in the third connection tube 42, and the ball 43 may be rotated by a valve 45 coupled to an outer surface of the ball 43. As illustrated in FIGS. 4 and 6, the through-hole 44 is opened when the through-hole 44 is positioned to be connected to the second circulation tube 40 by the rotation of the ball 43. As illustrated in FIGS. 3 and 5, the through-hole 44 is closed when the through-hole 44 is not connected to the second circulation tube 40 by the rotation of the ball.

In this case, when the first opening/closing member 21 closes the first connection tube 22, at least any one of the third connection tube 42 and the second connection tube 32 is opened by the third opening/closing member 41 and/or the second opening/closing member 31. When the first opening/closing member 21 opens the first connection tube 22, the second opening/closing member 31 closes the second connection tube 32, and the third opening/closing member 41 closes the third connection tube 42.

Specifically, referring to FIGS. 4, 5, and 6, the conical lateral surface 23 of the first opening/closing member 21 is inserted into the first connection tube 22 while being in close contact with the first connection tube 22. The first connection tube 22 is closed as the conical lateral surface 23 of the first opening/closing member 21 is inserted into the first connection tube 22 while being in close contact with the first connection tube 22. A position of the first opening/closing member 21 when the movement of the electrode slurry to the supply tube 20 is blocked may be defined as a "first position".

Referring to FIG. 3, the entire conical lateral surface 23 of the first opening/closing member 21 is withdrawn from the first connection tube 22. A position of the first opening/closing member 21 when the first connection tube 22 is opened and the electrode slurry may move to the supply tube 20 may be defined as a "second position".

Meanwhile, a position of the second opening/closing member 31 in a state in which the second opening/closing member 31 is inserted into the second connection tube 32 while being in close contact with the second connection tube 32 and the second connection tube 32 is closed as illustrated in FIGS. 3 and 4 may be defined as a "third position". A position of the second opening/closing member 31 in a state in which the entire second opening/closing member 31 is withdrawn from the second connection tube 32 and the second connection tube 32 is opened as illustrated in FIGS. 5 and 6 may be defined as a "fourth position".

That is, the first position of the first opening/closing member 21 may correspond to the third position of the second opening/closing member 31, and the second position of the first opening/closing member 21 may correspond to the fourth position of the second opening/closing member 31.

Meanwhile, a position of the third opening/closing member 41 in a state in which the third opening/closing member 41 is inserted into the third connection tube 42 while being in close contact with the third connection tube 42 and the third connection tube 42 is closed as illustrated in FIGS. 3 and 5 may be defined as a "fifth position". A position of the third opening/closing member 41 in a state in which the third opening/closing member 41 is rotated and the third connection tube 42 is opened as illustrated in FIGS. 4 and 6 may be defined as a "sixth position".

First, an operational principle will be described with reference to FIGS. 5 and 6. The first opening/closing member 21 moves toward the first connection tube 22, and then the conical lateral surface 23 of the first opening/closing member 21 is inserted into the first connection tube 22 and thus positioned at the first position. The second opening/closing member 31 moves toward a side opposite to the second connection tube 32, and then the conical lateral surface 23 of the second opening/closing member 31 is completely withdrawn from the second connection tube 32 and thus positioned at the fourth position. In this case, the third opening/closing member 41 may be positioned at the fifth position, i.e., the closed state illustrated in FIG. 5 or positioned at the sixth position, i.e., the opened state illustrated in FIG. 6.

On the contrary, referring to FIG. 3, the first opening/closing member 21 moves toward the side opposite to the first connection tube 22, and then the conical lateral surface 23 of the first opening/closing member 21 is completely withdrawn from the first connection tube 22 and thus positioned at the second position. The second opening/closing member 31 moves toward the second connection tube 32, and then the conical lateral surface 23 of the second opening/closing member 31 is inserted into the second connection tube 32 and thus positioned at the third position, and the third opening/closing member 41 is positioned at the fifth position, i.e., the closed state.

Therefore, when the first connection tube 22 is in a fully opened state (second position), the second and third connection tubes 32, 42 are positioned in fully closed states (third and fifth positions). In this case, a coated portion is formed on the substrate. In addition, when the first connection tube 22 is in a fully closed state (first position), the second connection tube 32 is positioned in a fully opened state (fourth position), and the third connection tube 42 is selectively opened or closed. In this case, a non-coated portion may be formed on the substrate.

That is, the first and second opening/closing members 21 and 31 may reciprocate at high speed in opposite directions and intermittently form the coated portion and the non-coated portion on the substrate only under the control of the opening/closing member without complicatedly controlling a slurry supply pump.

The electrode slurry control device 100 has the first circulation tube 30 separately provided in addition to the supply tube 20, such that the electrode slurry may continuously circulate through the main body 10 even at the time of forming the non-coated portion on the substrate, which makes it possible to reduce the pressure applied to the main body 10 even without stopping the operation of the slurry supply pump.

When the second connection tube 32 is in the fully opened state (fourth position), physical properties of the electrode slurry passing through the second connection tube 32 are changed, which may adversely affect electrode coating quality. This is because of the shape of the second opening/closing member 31 and the shape of the second connection tube 32 that apply high shear stress to the slurry.

The shear stress is an essential element to disperse the slurry in a mixing process that is a step performed prior to a coating process. However, the shear stress needs to be minimized after the slurry is completed through the mixing process. If an additional shearing force is inadvertently generated after the mixing process, the flowing two problems may occur.

First, the shear stress may adversely affect an interface of the slurry applied onto the substrate. When the shear stress is consistently applied to the slurry, a viscosity of the slurry (viscosity curve) is changed. In particular, a viscosity gradient of a viscosity curve (having an x-axis indicating viscosities and a y-axis indicating shear rates) affects a shape of the interface of the slurry applied onto the substrate. If a coating interface cannot be managed, an appropriate ratio between the positive electrode and the negative electrode in the completed lithium-ion battery is broken, which may cause a fire due to lithium precipitation.

Second, when the shear stress is applied by viscoelastic properties in the case of the negative electrode, there may occur a problem in that a filter (a foreign substance filter installed in a slurry movement tube) is clogged or coating quality deteriorates. (Viscoelasticity means an indicator indicating viscosity (viscous property) and elasticity (elastic property) of an object). When the shearing force is applied in the case of the negative electrode, a particle network is formed, which may cause a risk that solid properties are shown. For this reason, there occurs a problem in that the filter is clogged or coating quality deteriorates.

To solve the above-mentioned problems, an object of the present disclosure is to provide a method that additionally provides the second circulation tube 40 and allows the slurry to bypass the second opening/closing member 31 and the second connection tube 32 that apply high shear stress to the slurry. Further, an object of the present disclosure is to improve a shape of the first opening/closing member 21, a shape of the first connection tube 22, a shape of the second opening/closing member 31, and a shape of the second connection tube 32 to minimize the shear stress.

To solve the problem, the state of the third connection tube 42 is changed to the fully opened state (sixth position) in case that the coating is stopped over a long period of time. Therefore, the slurry may bypass the second opening/closing member 31 and the second connection tube 32 and thus less receive shear stress, which makes it possible to prevent a change in physical properties.

In case that the coating is stopped over a long period of time, the third opening/closing member 41 may be opened, and the third connection tube 42 may be opened. However, during the intermittent coating (pattern coating), the slurry needs to be controlled by the first opening/closing member 21 and the second opening/closing member 31 that may be opened or closed at high speed, and the third connection tube 42 needs to be closed. Therefore, in case that the coating is instantaneously stopped during the intermittent coating, the slurry needs to inevitably pass through the second opening/closing member 31 and the second connection tube 32. In case that the coating is performed, the slurry needs to inevitably pass through the first opening/closing member 21 and the first connection tube 22. The present disclosure prevents a change in physical properties of the slurry by minimizing the shear stress applied to the slurry by setting the cone angle of the opening/closing member to 110 to 150 degrees.

MODE FOR INVENTION

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims rather than the detailed description, and it should be interpreted that the meaning and scope of the claims and various embodiments derived from the equivalent concepts thereto fall within the scope of the present invention.

Hereinafter, the present specification will be described in more detail with reference to Examples. However, the following examples are intended to illustratively describe the present specification, and the scope of the present specification is not limited by the following examples.

Experimental Example 1

Flow Velocity Distribution

A flow analysis was performed to evaluate the effect of the present disclosure that minimizes the shear stress applied to the slurry by setting the cone angle of the opening/closing member to 110 to 150 degrees. The opening/closing member in the related art having a cone angle of 90 degrees and the opening/closing member according to the present disclosure having a cone angle of 120 degrees are compared and analyzed. A specific flow analysis method is as follows. One of negative electrode slurry used for a cylindrical battery of LG energy solution was used as a working fluid. A viscosity curve of the slurry was obtained by being actually measured by a viscometer, and then was curve-fitted to a Carreau-Yasuda model, and inputted into a flow analysis program. Variables such as a density of the slurry, a flow rate of the slurry, a size of the valve, and a stroke of the valve (a degree to which the valve is opened) were selected so that an actual coating process is properly reflected. The analysis was performed in a steady state, and a turbulent flow model was used. The used analysis tool is STAR-CCM+ of Siemens. The results are shown in FIGS. 8 and 11.

FIG. 8A is a view illustrating a change in flow velocity in the connection tube in which the cone valve having a cone angle of 90 degrees is provided in a regular position, and FIG. 8B is a view illustrating a change in flow velocity in the connection tube in which the cone valve having a cone angle of 120 degrees is provided in a regular position.

FIG. 11A is a view illustrating a change in flow velocity in the connection tube in which the cone valve having the cone angle of 90 degrees is provided in a reverse position, and FIG. 11B is a view illustrating a change in flow velocity in the connection tube in which the cone valve having the cone angle of 120 degrees is provided in a reverse position.

According to the results of the flow analysis illustrated in FIGS. 8B and 11B, it can be seen that the use of the opening/closing member having the cone angle of 120 degrees may reduce a maximum flow velocity of the slurry in comparison with the opening/closing member having the cone angle of 90 degrees illustrated in FIGS. 8A and 11A. The shear stress applied to the fluid is (viscosity×shear strain rate). In general, when the other conditions remain the same, the shear strain rate decreases as the flow velocity decreases. Therefore, it can be seen that the maximum shear stress applied to the slurry is further decreased when the cone angle is 120 degrees than when the cone angle is 90 degrees.

Experimental Example 2

Shear Stress Distribution

Like Experimental Example 1, a flow analysis was performed to evaluate the effect of the present disclosure that minimizes the shear stress applied to the slurry by setting the cone angle of the opening/closing member to 110 to 150 degrees. In this case, the shear stress was calculated by (slurry viscosity×slurry shear strain rate). A specific flow analysis method is identical to that in Experimental Example 1. The results showing the distribution of the shear stress applied to the slurry are shown in FIGS. 9 and 12.

Specifically, FIG. 9A is a view illustrating a change in shear stress in the connection tube in which the cone valve having the cone angle of 90 degrees is provided in the regular position, and FIG. 9B is a view illustrating a change in shear stress in the connection tube in which the cone valve having the cone angle of 120 degrees is provided in the regular position. In addition, FIG. 12A is a view illustrating a change in shear stress in the connection tube in which the cone valve having the cone angle of 90 degrees is provided in the reverse position, and FIG. 12B is a view illustrating a change in shear stress in the connection tube in which the cone valve having the cone angle of 120 degrees is provided in the reverse position.

It can be seen, from the contour graphs in FIGS. 9 and 12, that the maximum shear stress applied to the slurry is further decreased when the cone angle is 120 degrees than when the cone angle is 90 degrees.

Experimental Example 3

Pressure Loss Distribution

In the present experiment, a flow analysis was performed to analyze a pressure loss when the cone angle was set to 110 to 150 degrees. A specific flow analysis method is identical to that in Experimental Example 1. The results showing the distribution of the static pressure applied to the slurry are shown in FIGS. 10 and 13.

Specifically, FIG. 10A is a view illustrating a change in pressure in the connection tube in which the cone valve having the cone angle of 90 degrees is provided in the regular position, and FIG. 10B is a view illustrating a change in pressure in the connection tube in which the cone valve having the cone angle of 120 degrees is provided in the regular position. In addition, FIG. 13A is a view illustrating a change in pressure in the connection tube in which the cone valve having the cone angle of 90 degrees is provided in the reverse position, and FIG. 13B is a view illustrating a change in pressure in the connection tube in which the cone valve having the cone angle of 120 degrees is provided in the reverse position.

It can be seen, from the contour graphs illustrated in FIGS. 10 and 13, that the pressure loss is further decreased when the cone angle is 120 degrees than when the cone angle is 90 degrees. According to Experimental Examples 1 to 3, it can be ascertained that the use of the opening/closing member having the cone angle of 110 to 150 degrees may reduce a load of the slurry pump and make the smooth motion of the opening/closing member.

Experimental Example 4

The flow analysis of the present experiment shows that a tube system in the related art, in which the second circulation tube 40 and the third opening/closing member 41 are not installed, affects the slurry. A valve having a cone angle of 90 degrees in the related art was used as the opening/closing member. The analysis region is a tube system in which the first opening/closing member 21 is closed and the second opening/closing member 31 is opened (coating interruption period). The flow analysis method on the remaining region, except for the analysis region, is identical to that in Experimental Example 1. The results are shown in FIGS. 14, 15, and 16. FIGS. 14, 15, and 16 illustrate a flow velocity distribution, a shear stress distribution, and a static pressure distribution, respectively.

The contour graph in FIG. 14 shows that a high flow velocity occurs in the vicinity of the second opening/closing member during the coating interruption period. Therefore, FIG. 15 illustrates that high shear stress occurs in the vicinity of the second opening/closing member. FIG. 16 illustrates that the second opening/closing member generates most of the pressure loss.

Therefore, it can be seen that the second circulation tube 40, which allows the slurry to bypass the second opening/closing member 31, is additionally required when the coating is stopped over a long period of time.

Experimental Example 5

The flow analysis of the present experiment shows that the slurry control device having the second circulation tube 40 and the third opening/closing member 41 affects the slurry. Like Experimental Example 4, the analysis region is a tube system in which the first opening/closing member 21 is closed and the second opening/closing member 31 is opened (coating interruption period). However, in the system, the second circulation tube 40 is added, and the third opening/closing member 41 is opened, such that the slurry may bypass the second opening/closing member 31. The flow analysis method on the remaining region, except for the analysis region, is identical to that in Experimental Example 4. The analysis results are shown in FIGS. 17, 18, and 19. FIGS. 17, 18, and 19 illustrate a flow velocity distribution, a shear stress distribution, and a static pressure distribution, respectively.

FIG. 17 illustrates that most of the slurry flows through the second circulation tube 40 and bypasses the second opening/closing member 31. Therefore, in comparison with FIG. 15, FIG. 18 illustrates that the shear stress decreases in the vicinity of the second opening/closing member. In addition, in comparison with FIG. 16, FIG. 19 illustrates that the pressure loss greatly decreases (28.22 kPa→12.01 kPa).

Therefore, it can be seen that the slurry control device having the second circulation tube 40 and the third opening/closing member 41 may reduce the shear stress applied to the slurry and decrease a pressure loss of the tube system.

The invention claimed is:

1. An electrode slurry control device comprising:

a main body having a receiving port configured to receive electrode slurry from an outside storage, the main body being a tube having openings directly connected to a first connection tube, a second connection tube, and a third connection tube directly connecting the main body to a supply tube, a first circulation tube, and a second circulation tube, respectively;

a coater configured to discharge the electrode slurry onto a substrate;

the supply tube configured to supply the electrode slurry from the main body to the coater, the supply tube being connected to the main body through the first connection tube having a first opening/closing member;

the first circulation tube configured to move a part of the electrode slurry from the main body to the storage, the first circulation tube being connected to the main body by the second connection tube having a second opening/closing member, the first circulation tube providing a first bypass route for the electrode slurry to circulate in a first complete loop between the main body and the outside storage without entering the supply tube; and the second circulation tube configured to move a part of the electrode slurry from the main body to the storage, the second circulation tube being connected to the main body by the third connection tube having a third opening/closing member, the second circulation tube providing a second bypass route for the electrode slurry to circulate in a second complete loop between the main body and the outside storage without entering the supply tube, wherein an average diameter of an inner peripheral surface of the second connection tube is smaller than an average diameter of an inner peripheral surface of the first circulation tube, wherein an average diameter of an inner peripheral surface of the third connection tube is larger than an average diameter of an inner peripheral surface of the second connection tube, and wherein the third opening/closing member has a through-hole extending therethrough having an average diameter that is configured to provide less shear stress to the electrode slurry than the second opening/closing member.

2. The electrode slurry control device of claim 1, wherein the electrode slurry control device is configured such that when the first opening/closing member closes the first connection tube, the second opening/closing member opens the second connection tube, the third opening/closing member opens the third connection tube, or the second opening/closing member and the third opening/closing member respectively open the second connection tube and the third connection tube, and/or wherein the electrode slurry control device is configured such that when the first opening/closing member opens the first connection tube, the second opening/closing member and the third opening/closing member respectively close the second connection tube and the third connection tube.

3. The electrode slurry control device of claim 1, wherein an average diameter of an inner peripheral surface of the first connection tube is smaller than an average diameter of an inner peripheral surface of the supply tube, and wherein the first opening/closing member has a conical shape, a diameter of a conical lateral surface of the first opening/closing member facing the first connection tube gradually decreases in a direction from an end of the first opening/closing member toward the first connection tube, and a cone angle of the conical lateral surface is 110 to 150 degrees.

4. The electrode slurry control device of claim 1, wherein the second opening/closing member has a conical shape, a diameter of a conical lateral surface of the second opening/closing member facing the second connection tube gradually decreases in a direction from an end of the second opening/closing member toward the second connection tube, and a cone angle of the conical lateral surface is 110 to 150 degrees.

5. The electrode slurry control device of claim 1, wherein the third opening/closing member is a ball valve having the through-hole extending therethrough, and an average diameter of the inner peripheral surface of the third connection tube is equal to the average diameter of the through-hole.

6. The electrode slurry control device of claim 1, further comprising:

a confluent tube connected to the first circulation tube and the second circulation tube, the confluent tube being configured such that the electrode slurry moving to the main body through the first circulation tube and the electrode slurry moving to the main body through the second circulation tube are merged in the confluent tube.

* * * * *